Sept. 6, 1960
C. M. WOLFE
2,952,000
PRESSURE MEASURING APPARATUS
Filed Dec. 18, 1956
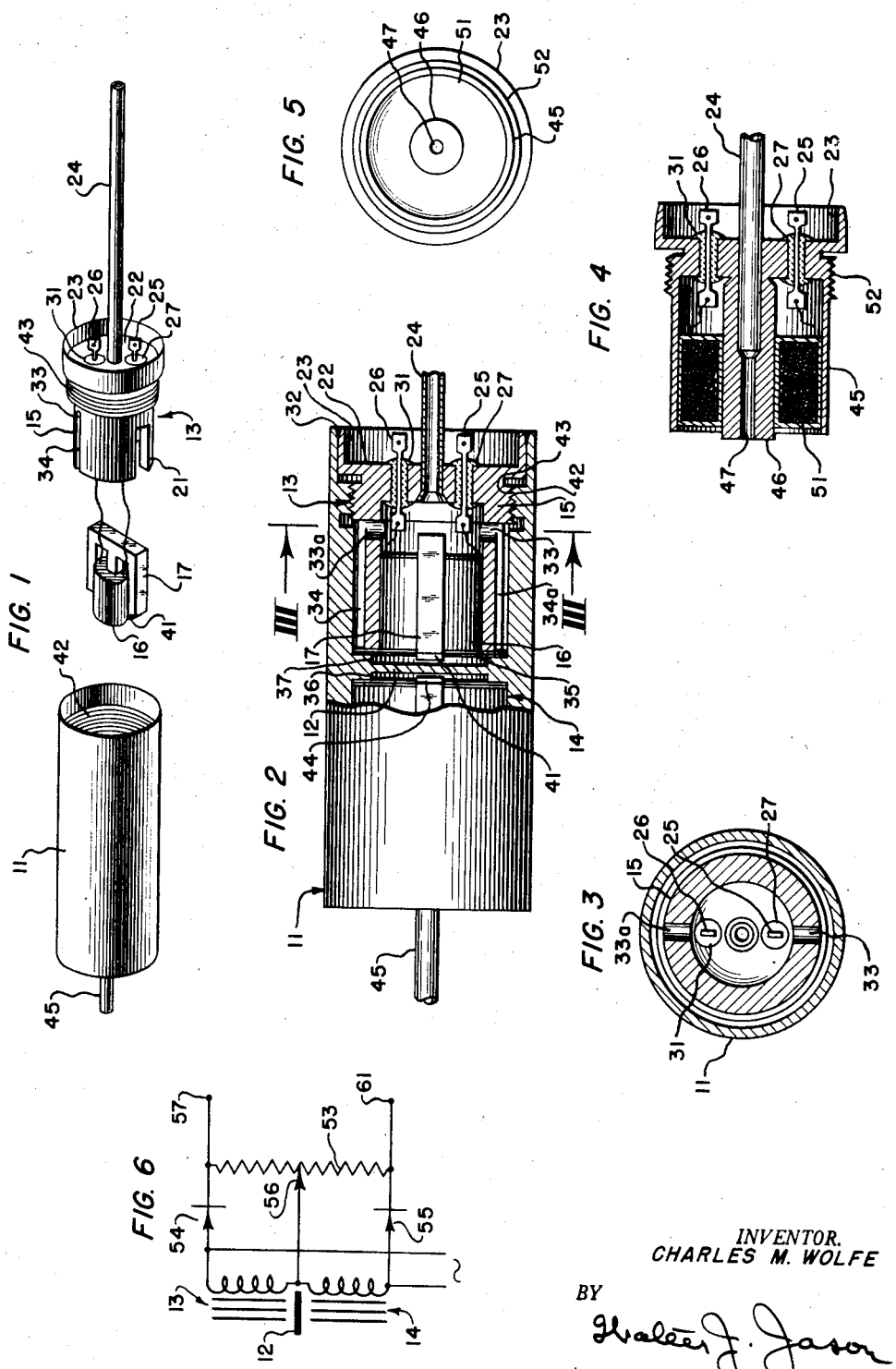
INVENTOR.
CHARLES M. WOLFE
BY
ATTORNEY

United States Patent Office 2,952,000
Patented Sept. 6, 1960

2,952,000

PRESSURE MEASURING APPARATUS

Charles M. Wolfe, Glendora, Calif., assignor to General Dynamics Corporation, San Diego, Calif., a corporation of Delaware Filed Dec. 18, 1956, Ser. No. 629,129

9 Claims. (Cl. 336—30)

This invention relates to fluid pressure measuring apparatus, and more particularly to an electrical variable reluctance fluid pressure transducer.

Electrical pressure transducers heretofore known to the art are extremely sensitive to changes in ambient temperature. Differential expansion of the materials of which prior art variable reluctance pressure transducers have been made causes variation of the zero output signal point as the temperature varies. Further, calibration of the transducers heretofore known to the art varies with changes in temperature. The temperature coefficients of expansion of the various portions of these prior transducers has also resulted in varying the tension of the diaphragm, whereby diaphragm deflection for a given pressure may vary with temperature, thereby varying the output electrical signal versus pressure characteristic of the transducer.

Attempts have been made to correct these variations of the zero signal point and sensitivity characteristics in prior art fluid pressure transducers by means of temperature sensitive resistance networks. As will be apparent, such networks require several resistors. They are bulky, frequently being larger and heavier than the transducer. Space must be provided for installation of the network as close to the transducer itself as possible. Further, sensitivity of the transducer is decreased by the resistor network, frequently requiring an amplifier to strengthen the signal, adding additional weight and space requirements. In many applications, particularly in aircraft and guided missiles, economy of space and weight is necessary, resulting in greatly reduced usefulness of such known transducers. Extreme care is employed in manufacturing such pressure transducers to reduce the undesirable temperature effects as much as possible, resulting in high cost. In addition, adjustment of the individual compensating resistor network associated with each transducer is a lengthy and expensive procedure.

The fluid pressure transducer of this invention is constructed in such a manner that variations of null signal position and sensitivity with temperature are substantially eliminated. As a result, the bulky temperature compensating resistive network is no longer required. In accordance with this invention, a variable reluctance coil is mounted on either side of a pressure sensitive diaphragm. The diaphragm is fabricated as an integral part of a tubular body, which also serves to retain the variable reluctance coils in cooperative relationship with the diaphragm. Integral fabrication of the diaphragm and body, and positive provisions for positioning the variable reluctance coils serve to substantially eliminate the variation of characteristics with temperature.

It is, therefore, an object of this invention to provide a pressure measuring device having characteristics independent of temperature variations.

Another object of this invention is to provide a pressure transducer having a temperature-stable null point.

Another object of this invention is to provide a pressure transducer having a temperature-stable sensitivity characteristic.

Another object of this invention is to provide a compact pressure transducer not requiring a temperature compensating resistive network.

Another object of this invention is to provide a pressure transducer operative over a wide range of pressures.

Another object of this invention is to provide a pressure transducer which is comparatively inexpensive to produce, is accurate, simple, light, compact and rugged.

Other objects and advantages of this invention will be evident from the following specification and appended drawings, wherein:

Figure 1 illustrates the pressure transducer of this invention partially disassembled, Figure 2 shows a partial longitudinal cross section of the pressure transducer, Figure 3 is a lateral cross-sectional view taken along line III—III of Figure 2, Figure 4 is a longitudinal cross section of an alternate form of variable reluctance pickup assembly of this invention, Figure 5 is an end view of the pickup assembly of Figure 4, and Figure 6 illustrates a suitable circuit arrangement for use with this invention.

Referring to the drawings, the pressure transducer includes a cylindrical body portion or housing 11. A diaphragm 12 is integrally formed therewith. Two variable reluctance pickup assemblies 13 and 14, are provided, one on each side of diaphragm 12. Variable reluctance pickup assembly 13 includes a cup shaped portion 15 adapted to receive coil 16 wound about an E-shaped core 17. A slot such as slot 21 is provided on each side of cup 15, adapted to snugly receive and hold the outer legs of core 17.

Cup shaped portion 15 is pickup assembly 13 is provided with a recessed head 22 and flange 23. A tube 24 is fitted to head 22 to provide a connection to the source of pressure to be measured. Electrical connections to coil 16 are made through lead-through connectors 25 and 26, insulated from head 22 by hermetically sealed insulators 27 and 31, in a manner well-known to the art. An hermetic seal between flange 23 of coil holding member 15 and body 11 is provided by suitable means. In a preferred embodiment, flange 23 is sealed to body 11 by soldered fillet 32 extending about the periphery of the flange 23.

As disclosed hereinabove, fluid is admitted to the hermetically sealed chamber defined by the cup member 15, body 11 and diaphragm 12 by tube 24. Apertures 33 and 33a, cooperating with grooves 34 and 34a, are provided in the wall of cup member 15 to enable ready passage of fluid around coil 16 and coil 17 from tube 24 to diaphragm 12 as pressure of the fluid varies.

E shaped core 17 is preferably fabricated of a plurality of E shaped laminations stacked to the required thickness, in a manner well-known to the art. The outer legs of the core 17 and the wall thickness of cup member 15 are of the same thickness, and groove 21 is cut to a width sufficient to snugly receive the stacked laminations. Although a laminated type of core is disclosed herein, it will be apparent to one skilled in the art that other types, such as a sintered core of powdered magnetic material may be employed instead.

Coil 16 is wound to fit snugly about the center leg of core 17 and of a diameter slightly less than the interior diameter of cup shaped holding member 15. A potting compound, indicated at 35 in Figure 2, serves to bond coil 16 to core 17, bond the coil and core assembly to holder 15, and isolate the insulation and conductors of the coil from the fluid. Obviously, the potting compound does not fill the space between tube 24 and apertures 33 and 33a, thereby enabling fluid pressure to be applied to the diaphragm 12 through grooves 34 and 34a. The potting compound employed has a low vapor pressure to prevent false fluid pressure readings, and adheres tightly to the core, coil and holder. Potting materials suitable for comparatively low temperatures include polyester resins derived from allyl alcohol, such as diallyl thalate, while for high temperatures a glass filled silicone resin may be employed. As will be obvious to one skilled in the art many other suitable compounds may be employed in practicing this invention.

Variable reluctance pickup assemblies 13 and 14 are disposed on either side of, and cooperate with diaphragm 12. In order to provide a zero output signal at zero pressure differential, variable reluctance pickup 14 is substantially identical to variable reluctance pickup 13 described hereinabove. As is well-known to those skilled in the art, pickups 13 and 14 must also be equally spaced from diaphragm 12 to provide a zero output signal with identical pressures acting on either side of the diaphragm. The spacing of pickups 13 and 14 from diaphragm 12 are maintained at a constant distance despite wide changes in temperature, shock, vibration or other environmental conditions. Shoulders 36 and 37 are provided on either side of diaphragm 12, integral therewith and with body member 11. Shoulder 36 enables precise positioning of variable reluctance pickup assembly 14 with respect to diaphragm 11. Similarly shoulder 35 enables accurate positioning of variable reluctance pickup assembly 13 with respect to diaphragm 12.

As is well-known to those skilled in the art, the amplitude of the output signal from such a variable reluctance pressure transducer is dependent upon the differential spans of the air gaps between diaphragm 12 and the cores of pickup assemblies 13 and 14. Thus, to enable a zero signal output when equal pressures are present on both sides of diaphragm 12, the magnetic circuits, including the air gaps between the cores and diaphragm, are substantially identical. To prevent drift of the zero output signal point with changes in temperature, means are provided whereby the position of the pickup assemblies do not vary with temperature. The zero output signal point is stabilized over a large temperature range in the pressure transducer of this invention by means provided herein for positive positioning of the variable reluctance pickup assemblies 13 and 14 with respect to diaphragm 12. Inasmuch as the pressure transducer disclosed herein is symmetrical on either side of diaphragm 12, only the position mounting means for pickup 13 is described herein. It will be understood that the position of pickup assembly 14 is maintained in a manner substantially identical to that disclosed herein in connection with pickup assembly 13.

The length of the air gap between E-shaped core 17 and diaphragm 12 is fixed in a positive manner by the abutment of core 17 against shoulder 37. A portion of each of the outer legs of E-shaped core 17 is also cut away to provide notches 41 cooperating with shoulder 37.

Internal screw thread 42 is cut into body portion 11. Mating external screw thread 43 is cut into the outer wall of coil-mounting cup member 15. Cup member 15 is screwed into body 11 until notches 41 on E core 17 are firmly seated on shoulder 37. Flange 23 of cup member 15 is then sealed to body member 11 by means of a welded, silver soldered, or other suitable seal 32, mechanically fixing the relative positions of cup member 15 with respect to body 11, and, therefore, core 17 with respect to diaphragm 12. The air gap between the magnetic core and the diaphragm is thus permanently fixed, and is not affected by changes in temperature, shock, vibration, etc. Variable reluctance pickup assembly 14, substantially identical to variable reluctance pickup assembly 13, is mounted in body member 11 in the same manner disclosed hereinabove in connection with variable reluctance pickup assembly 13. A notch 44 is provided on each side of the E shaped core associated with variable reluctance pickup assembly 14. Notches 44 firmly engage shoulder 36 as pickup assembly 14 is screwed into body member 11, defining the air gap between the E-shaped core and diaphragm 12. A tube 45, similar to tube 24, is provided to enable application of fluid pressure to the diaphragm 12 from the side thereof occupied by variable reluctance pickup assembly 14.

Variations of sensitivity of the pressure transducer due to temperature variations are substantially eliminated by means of the unitary construction of the diaphragm 12 and body 11. Thus, as diaphragm 12 increases in diameter, as temperature increases, body 11 also expands at the same rate increasing the internal diameter, and maintaining the diaphragm pressure-deflection characteristic constant. Further, since the E-shaped magnetic cores are firmly and positively seated against shoulders 36 and 37 by the means disclosed hereinabove, air gaps between the cores and the diaphragm cannot vary with temperature chages, thereby providing a definite and reproducible zero output signal point when equal pressures are present on both sides of diaphragm 12.

A modification of variable reluctance pickup assemblies 13 and 14 are illustrated by Figures 4 and 5. A cup member 45, fabricated of a suitable magnetic material having low hysteresis loss and retentivity, and requiring a low coercive force, includes an integral, central core 46, of cylindrical shape. A concentric aperture 47 is provided in central core 46, connecting with tube 24, thereby allowing free access of fluid to diaphragm 12. A cylindrically wound coil 51 is placed about central core 47. As will be apparent, the magnetic circuit defined by the outer walls of cap member 45 and central core 46 is a body of revolution defined by an E-shaped body, analgous to E-shaped core 17 disclosed hereinabove.

The two ends of coil 51 are connected to lead-through connectors 25 and 26, insulated from cylindrical cup member 45 by hermetically sealed insulators 27 and 31. An external screw thread 52, provided on the exterior of cup member 45, mates with internal screw thread 42 in body member 11. The end of cylindrical cup member 45 is seated upon shoulder 37 when cylindrical cup member 45 is assembled to body member 11. Flange 23 is hermetically sealed to body member 11 in the manner disclosed hereinabove in connection with Figure 2.

Returning now to Figure 2, each of the pickup assemblies 13 and 14 is provided with means for leading fluid to the space adjacent diaphragm 12. Thus, member 13 is equipped with apertures 33 and 33a which communicate with grooved fluid passageways 34 and 34a which lead to the space adjacent the diaphragm 12. Similarly, the pickup assembly illustrated by Figures 4 and 5 is equipped with aperture 47 leading to the space adjacent the diaphragm. Cylindrical conduits 24 and 45 enable connection of the pressure transducer to sources of fluid. Through these fluid conduits and passages, fluid may be introduced to either or both sides of the diaphragm. When used to measure differential pressure which may, for example, develop between the elements of a pitot-static head such as those employed for air speed indication, the pitot head may be connected to conduit 45 and the static head to conduit 24. Thus, the diaphragm will be urged away from pickup 14 and toward pickup 13 due to the difference in fluid pressure. Gage pressure of a fluid may be measured by connecting one conduit to the pressure source while the other conduit is open to the atmosphere. Thus, diaphragm 12 will be deflected by an amount proportional to the difference between the pressure of the fluid and atmospheric pressure. It may be desired to measure the absolute pressure of a fluid. To do so, the chamber on one side of the diaphragm is evacuated and the conduit associated therewith is sealed. The other conduit is connected to the fluid pressure to be measured. Diaphragm 12 will, therefore, be deflected by a distance proportional to the absolute pressure of the fluid.

Sensing and indication of the amount and direction of deflection of diaphragm 12 is obtained by serially connecting the coils of pickup assemblies 13 and 14 on either side of the diaphragm 12 to a suitable source of alternating current, as illustrated by Figure 6. Pickup assemblies 13 and 14 are connected to resistor 53 through diodes 54 and 55 respectively. Resistor 53 is provided with an adjustable center tap 56 connected to the junction of the pickup assemblies for balancing out any minor differences in impedance. A direct voltage appears across output terminal 57 and 61 proportional in amplitude to the amount of deflection of diaphragm 12, of one polarity if the diaphragm is deflected toward pickup assembly 13 and of opposite polarity when deflected toward pickup assembly 14.

When equal pressures are exerted on both sides of diaphragm 12, the impedances of both pickup assemblies are equal, and no output voltage appears across output terminals 57 and 61. As diaphragm 12 is deflected by a difference in fluid pressure between the chambers defined as disclosed hereinabove, exemplarily by a differential pressure urging the diaphragm toward pickup assembly 13, the reluctance of pickup assembly 13 decreases and the reluctance of pickup assembly 14 increases. As a result, the impedance of pickup 13 decreases and the voltage across the pickup also decreases. Conversely, the voltage across pickup 14 increases. This unbalance causes a positive polarity potential to appear at output terminal 61, proportional in amplitude to the displacement of diaphragm 12. Deflection of diaphragm 12 toward pickup assembly 14 causes a proportional positive potential to appear at terminal 57 in a similar manner. Other such circuits which may be employed in connection with the pressure transducer of this invention are illustrated and described in U.S. Patent No. 2,641,742, issued June 9, 1953 to C. M. Wolfe, et al.

Although it is presently preferred to fabricate body member 11, including integral diaphragm 12, and cup members such as 15, of a suitable magnetic material, it is anticipated that other, non-magnetic materials may be employed for various reasons. Exemplarily, for extremely light weight requirements, aluminum may be employed, or for use with highly corrosive fluids, it may be necessary to employ stainless steel. Diaphragm 12 may, therefore, be coated on both sides in a suitable manner with a plastic material heavily impregnated with magnetic particles of high permeability, such as powdered iron.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. A pressure transducer comprising a housing member, a flexible diaphragm, a shoulder surrounding the periphery of said diaphragm, said shoulder and said diaphragm being integrally formed with said housing, and a pickup assembly seated on said shoulder adjacent said diaphragm whereby variations of sensitivity and zero drift due to temperature variations are eliminated, a coil associated with said pickup assembly, a magnetic circuit including said diaphragm associated with said coil, a pressure-tight chamber defined by said pickup assembly and said diaphragm whereby deflection of said diaphragm varies the reluctance of said coil by an amount proportional to pressure in said chamber.

2. A pressure transducers comprising a housing member a flexible diaphragm, shoulders surrounding the periphery of each side of said diaphragm, said shoulders and said diaphragm being integrally formed with said housing, first and second pickup assemblies seated on said shoulders in said housing on either side of said diaphragm whereby variations of sensitivity and zero drift due to temperature variations are eliminated, first and second pressure-tight chambers, defined by said pickup assemblies and said diaphragm, a first coil associated with said first pickup assembly, a second coil associated with said second assembly, a first magnetic circuit including said diaphragm associated with said first coil, a second magnetic circuit including said diaphragm associated with said second coil whereby deflection of said diaphragm in response to a difference of pressure between said first and second chambers increases the reluctance of one magnetic circuit and decreases the reluctance of the other magnetic circuit by an amount proportional to the difference in pressure.

3. A pressure transducer comprising a housing member, a flexible diaphragm, shoulders surrounding the periphery of each side of said diaphragm, said shoulders and said diaphragm being integrally formed with said housing, first and second pickup assemblies seated on said shoulders in said housing on either side of said diaphragm whereby variations of sensitivity and zero drift due to temperature variations are eliminated, first and second pressure-tight chambers defined by said pickup assemblies and said diaphragm, first and second fluid conduits associated with said first and second chambers, a first coil associated with said first pickup assembly, a second coil associated with said second assembly, a first magnetic circuit including said diaphragm associated with said first coil, a second magnetic circuit including said diaphragm associated with said second coil whereby deflection of said diaphragm in response to a difference of fluid pressure between said first and second chambers increases the reluctance of one magnetic circuit and decreases the reluctance of the other magnetic circuit by an amount proportional to the difference in pressure.

4. A pressure transducer comprising a housing member, a flexible diaphragm, shoulders surrounding the periphery of each side of said diaphragm, said shoulders and said diaphragm being integrally formed with said housing member, a first pickup assembly including a first core of magnetic material and a first coil associated with said first core, a second pickup assembly including a second core of magnetic material and a second coil associated with said second core, said pickup assemblies seating on said shoulders for establishing said first and second pickup assemblies in relation to said diaphragm whereby variations of sensitivity and zero drift due to temperature variations are eliminated, a first chamber defined by said diaphragm and said first pickup assembly, a second chamber defined by said diaphragm and said second pickup assembly, a first conduit for applying fluid pressure to said first chamber and a second conduit for applying fluid pressure to said second chamber, whereby deflection of said diaphragm toward one of said cores in response to a difference of fluid pressure between said first and second chambers increases the impedance of one coil and decreases the impedance of the other coil by an amount proportional to the pressure difference.

5. A pressure transducer including a housing member, a flexible diaphragm, a shoulder surrounding the periphery of said diaphragm, said shoulder and said diaphragm being integrally formed with said housing member, a pickup assembly including a cup shaped member having a slotted wall, a three legged core of magnetic material having two outer legs fittingly engaging with said slotted wall, and a coil placed about the center leg of said core, the outer legs of said core seating on said shoulder for establishing said core in relation to said diaphragm whereby variations in sensitivity and zero drift due to temperature variations are eliminated, a chamber defined by said diaphragm and said pickup assembly, a conduit for applying fluid pressure to said chamber whereby deflection of said diaphragm with respect to said core in response to pressure varies the impedance of said coil by an amount proportional to the pressure in said chamber.

6. A pressure transducer including a housing member, a flexible diaphragm, shoulders surrounding the periphery of each side of said diaphragm, said shoulders and said diaphragm being integrally formed with said housing member, a first pickup assembly including a first three legged core of magnetic material and a first coil placed about the center leg of said first core, a second pickup assembly including a second three legged core of magnetic material and a second coil placed about the center leg of said second core, the outer legs of said cores seating on said shoulders for establishing said cores in relation to said diaphragm whereby variations of sensitivity and zero drift due to temperature variations are eliminated, a first chamber defined by said diaphragm and said first pickup assembly, a second chamber defined by said diaphragm and said second pickup assembly, a first conduit for applying fluid pressure to said first chamber and a second conduit for applying fluid pressure to said second chamber, whereby deflection of said diaphragm toward one of said cores in response to a difference of fluid pressure between said first and second chambers increases the impedance of one coil and decreases the impedance of the other coil by an amount proportional to the pressure difference.

7. A pressure transducer including a housing member, a flexible diaphragm, shoulders surrounding the periphery of each side of said diaphragm, said shoulders and said diaphragm being integrally formed with said housing member, a first pickup assembly including a first cup shaped member having a slotted wall, a first three legged core of magnetic material having two outer legs fittingly engaging with said slotted wall, and a first coil placed about the center leg of said first core, a second pickup assembly including a second cup shaped member having a slotted wall, a second three legged core of magnetic material having two outer legs fittingly engaging with said slotted wall, and a second coil placed about the center leg of said second core, the outer legs of said cores seating on said shoulders for establishing said cores in relation to said diaphragm whereby variations of sensitivity and zero drift due to temperature variations are eliminated, a first chamber defined by said diaphragm and said first pickup assembly, a second chamber defined by said diaphragm and said second pickup assembly, a first conduit for applying fluid pressure to said first chamber and a second conduit for applying fluid pressure to said second chamber, whereby deflection of said diaphragm toward one of said cores in response to a difference of fluid pressure between said first and second chambers increases the impedance of one coil and decreases the impedance of the other coil by an amount proportional to the pressure difference.

8. A pressure transducer including a housing member, a flexible diaphragm, shoulders surrounding the periphery of each side of said diaphragm, said shoulders and said diaphragm being integrally formed with said housing member, a first pickup assembly including a first cup shaped magnetic member having a first cylindrical outer wall, a first stud concentric with said first cylindrical wall, and a first coil placed about said first stud, a second pickup assembly including a second cup shaped magnetic member having a second cylindrical outer wall, a second stud concentric with said second cylindrical wall, and a second coil placed about said second stud, the outer walls of said magnetic members seating on said shoulders for establishing said magnetic members in relation to said diaphragm whereby variations of sensitivity and zero drift due to temperature variations are eliminated, a first chamber defined by said diaphragm and said first pickup assembly, a second chamber defined by said diaphragm and said second pickup assembly, a first conduit for applying fluid pressure to said first chamber and a second conduit for applying fluid pressure to said second chamber, whereby deflection of said diaphragm toward one of said magnetic members in response to a difference of fluid pressure between said first and second chambers increases the impedance of one coil and decreases the impedance of the other coil by an amount proportional to the pressure difference.

9. A pressure transducer including a housing member, a flexible diaphragm, shoulders surrounding the periphery of each side of said diaphragm, said shoulders and said diaphragm being integrally formed with said housing member, a first cup shaped magnetic member having a first cylindrical outer wall, a first stud concentric with said first cylindrical wall, and a first coil placed about said first stud, a second pickup assembly including a second cup shaped magnetic member having a second cylindrical outer wall, a second stud concentric with said second cylindrical wall and a second coil placed about said second stud, the outer walls of said magnetic members seating on said shoulders for establishing said magnetic members in relation to said diaphragm whereby variations of sensitivity and zero drift due to temperature variations are eliminated, a first chamber defined by said diaphragm and said first pickup assembly, a second chamber defined by said diaphragm and said second pickup assembly, first means for applying fluid pressure to said chambers including a first fluid conduit connected to said first magnetic member and a passage through said first stud communicating with said first chamber, a second fluid conduit connected to said second magnetic member and a passage through said second stud communicating with said second chamber, whereby deflection of said diaphragm toward one of said magnetic members in response to a difference of fluid pressure between said first and second chambers increases the impedance of one coil and decreases the impedance of the other coil by an amount proportional to the pressure difference.

References Cited in the file of this patent

UNITED STATES PATENTS

| | | |
|---|---|---|
| 1,718,494 | Schurig | June 25, 1929 |
| 2,250,471 | DeBruin | July 29, 1941 |
| 2,641,742 | Wolfe | June 9, 1953 |
| 2,683,989 | Clark | July 20, 1954 |